United States Patent
Sugano et al.

(10) Patent No.: US 11,541,751 B2
(45) Date of Patent: Jan. 3, 2023

(54) VEHICLE STOP SUPPORT SYSTEM

(71) Applicant: Mazda Motor Corporation, Hiroshima (JP)

(72) Inventors: Takashi Sugano, Hiroshima (JP); Takuya Yamashita, Hiroshima (JP); Takesato Fushima, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 720 days.

(21) Appl. No.: 16/545,157

(22) Filed: Aug. 20, 2019

(65) Prior Publication Data

US 2020/0070842 A1 Mar. 5, 2020

(30) Foreign Application Priority Data

Aug. 28, 2018 (JP) .............................. JP2018-159069

(51) Int. Cl.
*B60K 28/06* (2006.01)
*B60W 40/09* (2012.01)
(Continued)

(52) U.S. Cl.
CPC ............ *B60K 28/06* (2013.01); *B60W 10/04* (2013.01); *B60W 10/182* (2013.01); *B60W 10/20* (2013.01); *B60W 30/18054* (2013.01); *B60W 40/09* (2013.01); *B60W 2040/0872* (2013.01); *B60W 2420/42* (2013.01)

(58) Field of Classification Search
CPC ..... B60K 28/06; B60W 10/04; B60W 10/182; B60W 10/20; B60W 30/18054; B60W 40/09; B60W 2040/0872; B60W 2420/42; B60W 2540/045; B60W 2540/221; B60W 2540/223; B60W 2540/225;
(Continued)

(56) References Cited

U.S. PATENT DOCUMENTS

2016/0200317 A1* 7/2016 Danzl .................. B60W 10/04
701/25
2017/0297567 A1 10/2017 Matsumura

FOREIGN PATENT DOCUMENTS

JP 2017001519 A 1/2017
JP 2017190048 A 10/2017

OTHER PUBLICATIONS

Martin et al, Machine Translation of EP2860078, Apr. 15, 2015 (Year: 2015).*

* cited by examiner

*Primary Examiner* — Alan D Hutchinson
(74) *Attorney, Agent, or Firm* — Alleman Hall Creasman & Tuttle LLP

(57) ABSTRACT

Provided is a vehicle stop support system for supporting vehicle stop in an emergency condition. The vehicle stop support system sets a target time period based on physical abnormality of a driver; sets an allowable lateral acceleration, based on the abnormality; estimates a time period required to reach each of a plurality of stop point candidates; estimates a lateral acceleration to be generated during traveling of a vehicle to each of the candidates; sets a stop point; and controls the vehicle to travel to the stop point and stop at the stop point. The system is operable to set, as the stop point, one of the candidates which satisfies a condition that the lateral acceleration estimated with respect thereto is equal to or less than the allowable lateral acceleration, and the required time period estimated with respect thereto is equal to or less than the target time period.

6 Claims, 6 Drawing Sheets

(51) Int. Cl.
*B60W 10/04* (2006.01)
*B60W 10/20* (2006.01)
*B60W 30/18* (2012.01)
*B60W 10/18* (2012.01)
*B60W 40/08* (2012.01)

(58) Field of Classification Search
CPC ......... B60W 2540/26; B60W 2556/50; B60W 10/06; B60W 10/184
See application file for complete search history.

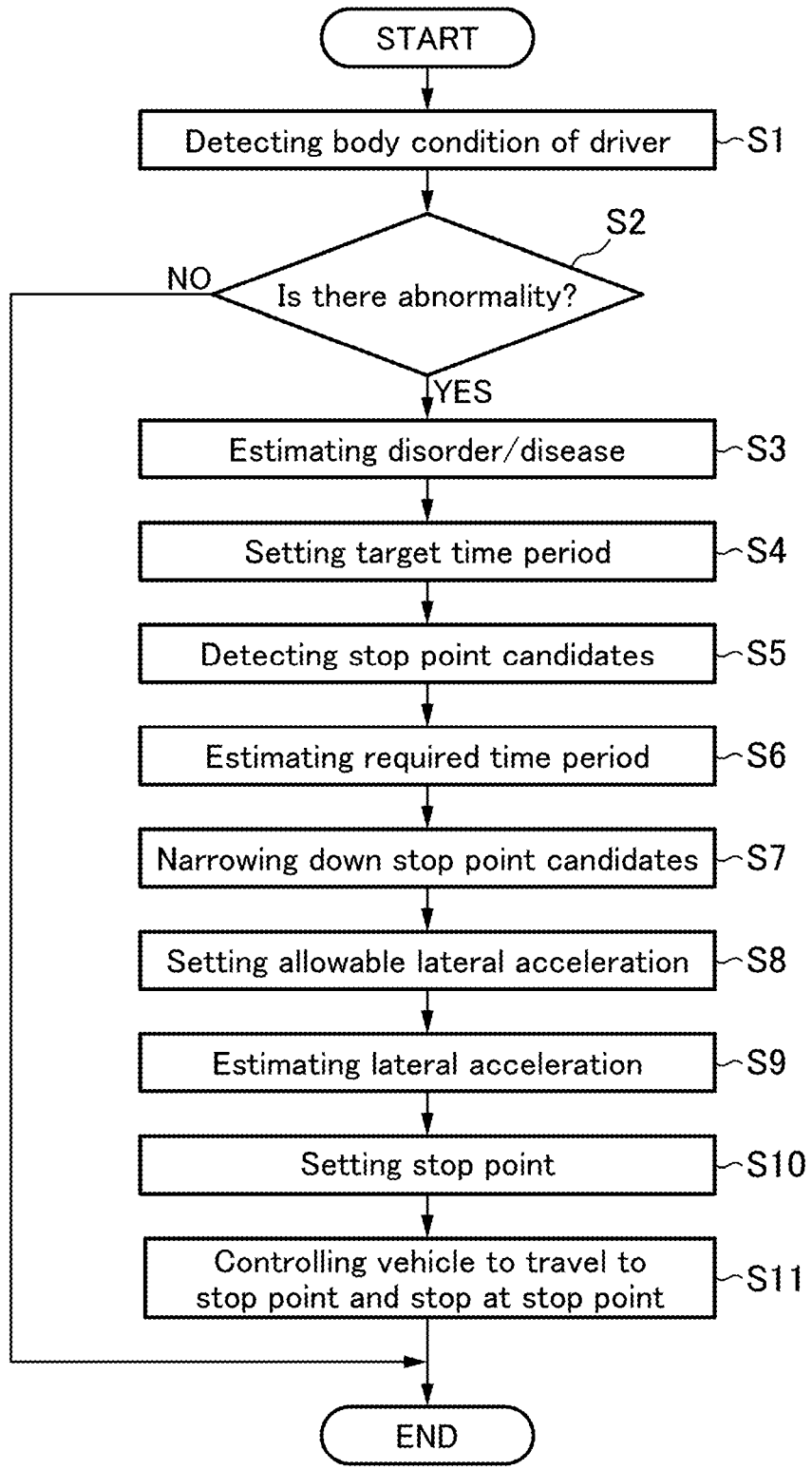

FIG. 6

| Disorder/Disease | Target Time Period |
|---|---|
| Subarachnoid Hemorrhage Myocardial Infarction | T1 |
| Hypoglycemia | T2 |
| Epilepsy | T3 |

FIG. 7

| State of Consciousness | Open/closed state of eyes | Line-Of-Sight Direction | Center-Of-Gravity Position | Allowable Lateral Acceleration |
|---|---|---|---|---|
| Conscious | Open state | Traveling direction | Adequate | $Gy_{10}$ |
| | | | Inadequate | $Gy_6$ |
| | | Direction other than traveling direction | Adequate | $Gy_8$ |
| | | | Inadequate | $Gy_4$ |
| | Closed state | | Adequate | $Gy_6$ |
| | | | Inadequate | $Gy_2$ |
| Unconscious | | | Adequate | $Gy_3$ |
| | | | Inadequate | $Gy_1$ |

VEHICLE STOP SUPPORT SYSTEM

TECHNICAL FIELD

The present invention relates to a vehicle stop support system for supporting stop of a vehicle which is traveling.

BACKGROUND ART

There has been known a system for causing a vehicle to stop on behalf of a driver, in the event that the driver becomes unable to continue safe driving due to a sudden change in his/her body condition or the like (such a driver will hereinafter be referred to also as "driver in an emergency condition"). For example, in the following Patent Document 1, there is disclosed a system for causing a vehicle to stop in an evacuation space, upon detection of a physical abnormality of a driver. Further, as an improvement to such a system, in the Patent Document 2, there is disclosed prohibiting a vehicle from stopping in an area having poor visibility. This vehicle stop support system makes it possible to keep a driver in an emergency condition, a fellow passenger and other road user away from danger of a vehicle collision, and rescue the driver after stop of the vehicle.

CITATION LIST

Patent Document

Patent Document 1: JP 2017-001519A
Patent Document 2: JP 2017-190048A

SUMMARY OF INVENTION

Technical Problem

In recent years, along with development of technologies for automated vehicle driving, technologies concerning components such as a high-accuracy geographic map and a vehicle-mounted camera have been making great progress. In the field of vehicle stop support systems, it is expected to effectively utilize information provided from these components to support vehicle stop so as to further contribute to rescue of a driver in an emergency condition.

The present invention has been made to fulfill this demand, and an object of the present invention to provide a vehicle stop support system capable of supporting vehicle stop so as to further contribute to rescue of a driver in an emergency condition.

Solution to Technical Problem

In order to achieve the above object, the present invention provides a vehicle stop support system for supporting stop of a vehicle which is traveling. The vehicle stop support system comprises: an abnormality detection part for detecting a physical abnormality of a driver; a target time period setting part for setting a target time period based on the abnormality detected by the abnormality detection part; an allowable value setting part for setting an allowable lateral acceleration, based on the abnormality detected by the abnormality detection part; a candidate detection part for detecting a plurality of stop point candidates which exist in a traveling direction of the vehicle; a required time period estimation part for estimating a time period required to reach each of the stop point candidates; an acceleration estimation part for estimating a lateral acceleration to be generated during traveling of the vehicle to each of the stop point candidates; a stop point setting part for setting a stop point; and a vehicle control part for controlling the vehicle to travel to the stop point and stop at the stop point, wherein the stop point setting part is operable to set, as the stop point, one of the plurality of stop point candidates which satisfies a condition that the lateral acceleration estimated with respect thereto by the acceleration estimation part is equal to or less than the allowable lateral acceleration, and the required time period estimated with respect thereto is equal to or less than the target time period.

In order to quickly start a rescue operation, it is necessary to stop the vehicle (own vehicle) at the stop point as quick as possible. However, if an excessively large lateral acceleration (i.e., acceleration in a width direction of the vehicle) is generated during traveling of the vehicle to the stop point, the posture of the driver who is in an emergency condition is likely to become largely imbalanced, leading to worsening of the body condition of the driver.

In the vehicle stop support system of the present invention, one of the stop point candidates which satisfies the condition that the lateral acceleration estimated with respect thereto by the acceleration estimation part is equal to or less than the allowable lateral acceleration is set as the stop point. The "allowable lateral acceleration" means the maximum value of a lateral acceleration against which the driver can resist to maintain his/her posture, and is set based on the abnormality of the driver detected by the abnormality detection part. Thus, by setting the allowable lateral acceleration to a relatively small value when the abnormality is severe, it becomes possible to prioritize suppression of the lateral acceleration, thereby suppressing the situation where the posture of the driver becomes largely imbalanced. On the other hand, by setting the allowable lateral acceleration to a relatively large value when the abnormality is not severe, it becomes possible to prioritize traveling of the vehicle, thereby stopping the vehicle at the stop point as quick as possible.

In the vehicle stop support system of the present invention, the target time period is set based on the physical abnormality of the driver detected by the abnormality detection part. Thus, for example, by setting a relatively short target time period with respect to a physical abnormality having a relatively high urgency, it becomes possible to quickly stop the vehicle to start a rescue operation. On the other hand, by setting a relatively long target time period with respect to a physical abnormality having a relatively low urgency, it becomes possible to set the stop point from among a larger number of stop point candidates.

Preferably, in the vehicle stop support system of the present invention, the abnormality detection part is operable to detect a state of consciousness of the driver, wherein the allowable value setting part is operable, when it is detected that the driver is unconscious, to set the allowable lateral acceleration to a value less than that to be set when it is detected that the driver is conscious.

When the driver is unconscious, the driver becomes difficult to strain to physically resist against the lateral acceleration.

According to the above feature, when it is detected that the driver is unconscious, the allowable lateral acceleration is set to a value less than that to be set when it is detected that the driver is conscious, so that it is possible to suppress the lateral acceleration during traveling of the vehicle to the stop point. This makes it possible to suppress the situation where the posture of the driver becomes largely imbalanced, even when the driver is unconscious.

Preferably, in the vehicle stop support system of the present invention, the abnormality detection part is operable to detect an open/closed state of eyes of the driver, wherein the allowable value setting part is operable, when it is detected that the eyes of the driver are in the closed state, to set the allowable lateral acceleration to a value less than that to be set when it is detected that the eyes of the driver are in the open state.

When the eyes of the driver are in the closed state, the driver becomes difficult to strain by predicting the behavior of the vehicle.

According to the above feature, when it is detected that the eyes of the driver are in the closed state, the allowable lateral acceleration is set to a value less than that to be set when it is detected that the eyes of the driver are in the open state, so that it is possible to suppress the lateral acceleration during traveling of the vehicle to the stop point. This makes it possible to suppress the situation where the posture of the driver becomes largely imbalanced, even when the eyes of the driver are in the closed state.

Preferably, in the vehicle stop support system of the present invention, the abnormality detection part is operable to detect a line-of-sight direction of the driver, and determine whether or not the line-of-sight direction of the driver is coincident with the traveling direction of the vehicle, wherein the allowable value setting part is operable, when the line-of-sight direction of the driver is determined not to be coincident with the traveling direction of the vehicle, to set the allowable lateral acceleration to a value less than that to be set when the line-of-sight direction of the driver is determined to be coincident with the traveling direction of the vehicle.

"The line-of-sight direction of the driver is coincident with the traveling direction of the vehicle" means that the line-of-sight direction of the driver falls within a given range including the traveling direction of the vehicle. That is, "the line-of-sight direction of the driver is coincident with the traveling direction of the vehicle" means that the line-of-sight direction of the driver is approximately coincident with the traveling direction of the vehicle, but does not mean that the line-of-sight direction of the driver is exactly coincident with the traveling direction of the vehicle.

When the line-of-sight direction of the driver is not coincident with the traveling direction of the vehicle, the driver becomes difficult to strain by predicting the behavior of the vehicle.

According to the above feature, when the line-of-sight direction of the driver is determined not to be coincident with the traveling direction of the vehicle, the allowable lateral acceleration is set to a value less than that to be set when the line-of-sight direction of the driver is determined to be coincident with the traveling direction of the vehicle, so that it is possible to suppress the lateral acceleration during traveling of the vehicle to the stop point. This makes it possible to suppress the situation where the posture of the driver becomes largely imbalanced, even when the line-of-sight direction of the driver is not coincident with the traveling direction of the vehicle.

Preferably, in the vehicle stop support system of the present invention, the abnormality detection part is operable to detect a center-of-gravity position of the driver, and determine whether or not the center-of-gravity position of the driver is adequate, wherein the allowable value setting part is operable, when the center-of-gravity position of the driver is determined not to be adequate, to set the allowable lateral acceleration to a value less than that to be set when the center-of-gravity position of the driver is determined to be adequate.

When the center-of-gravity position of the driver is not adequate, the posture of the driver is off-balance. Thus, if a lateral acceleration is generated, the posture is likely to become largely imbalanced.

According to the above feature, when the center-of-gravity position of the driver is determined not to be adequate, the allowable lateral acceleration is set to a value less than that to be set when the center-of-gravity position of the driver is determined to be adequate, so that it is possible to suppress the lateral acceleration during traveling of the vehicle to the stop point. This makes it possible to suppress the situation where the posture of the driver becomes largely imbalanced, even when the center-of-gravity position of the driver is not adequate.

Preferably, the vehicle stop support system of the present invention further comprises a storage part preliminarily storing therein a plurality of values of the target time period each corresponding to a respective one of a plurality of physical abnormalities, wherein the target time period setting part is operable to read, from the storage part, one of the stored values of the target time period which corresponds to the abnormality detected by the abnormality detection part.

According to this feature, it is possible to suppress a situation where, due to disturbance or the like, the target time period setting part undesirably operates to set the target time period to an inappropriately-short or -long value. This makes it possible to set, as the target time period, a sufficient time period required for the physical abnormality of the driver.

Preferably, in the vehicle stop support system of the present invention, the vehicle control part is operable, when the abnormality detection part detects the abnormality, to control the vehicle to travel at a vehicle speed which is lower than a predetermined value.

According to this feature, it is possible to suppress an inertia force acting on the driver during stop of the vehicle. This makes it possible to allow the driver in an emergency condition to wait for rescue without a large postural imbalance.

Effect of Invention

The present invention can provide a vehicle stop support system capable of supporting vehicle stop so as to further contribute to rescue of a driver in an emergency condition.

BRIEF DESCRIPTION OF DRAWINGS

FIG. 5 is a flowchart showing a processing routine to be executed by an ECU.

FIG. 6 is a table showing a correspondence relationship between a disorder/disease and a target time period.

FIG. 7 is a table showing a correspondence relationship between a body condition of a driver and an allowable lateral acceleration.

DESCRIPTION OF EMBODIMENTS

With reference to accompanying drawings, one embodiment of the present invention will now be described. For the sake of facilitating understanding of the description, the same reference sign is assigned to the same elements or components in the figures, and duplicated description of such a component will be omitted.

Figure 1:
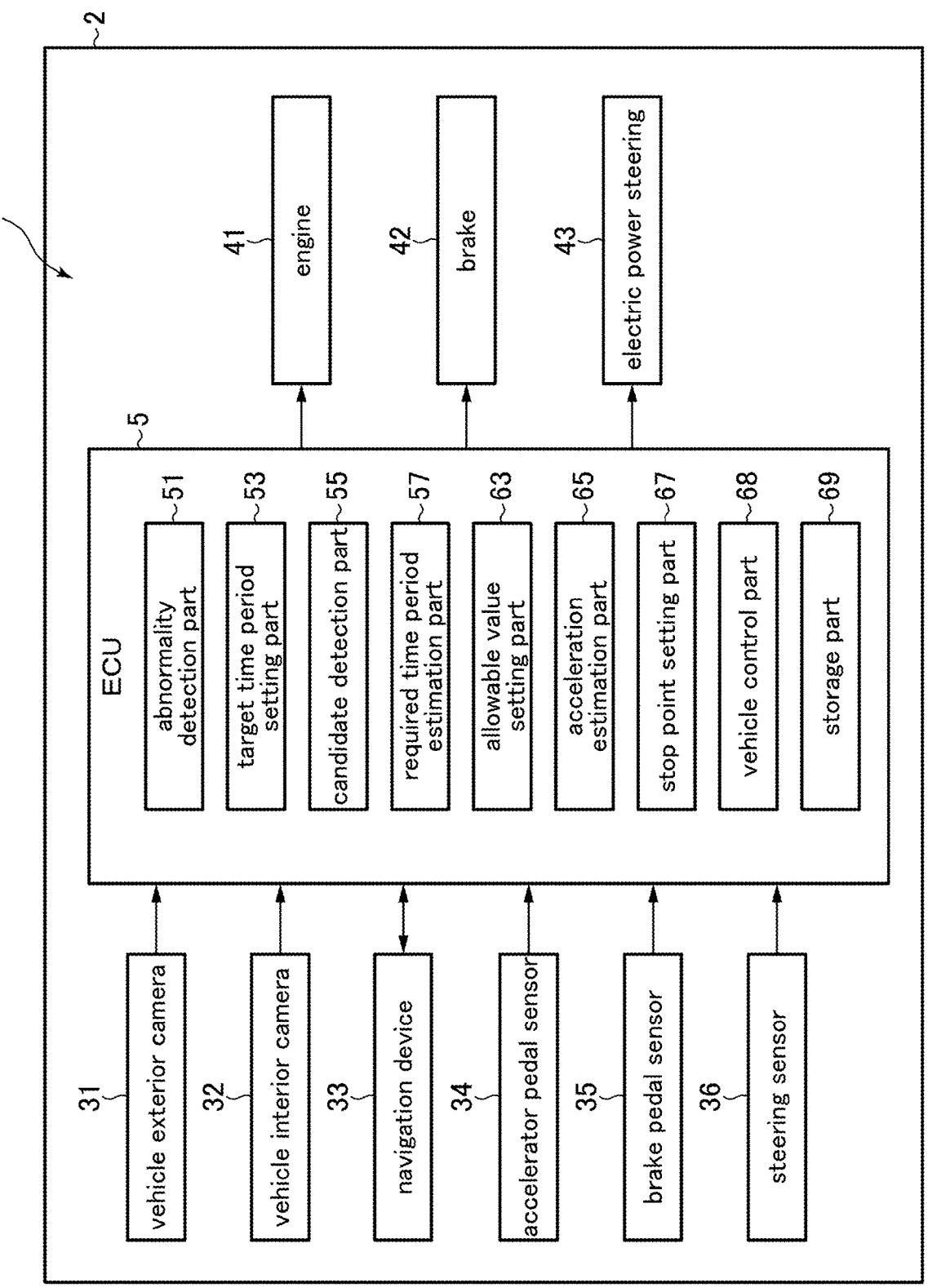
FIG. 1 is a block diagram showing a vehicle stop support system according to one embodiment of the present invention.

First of all, with reference to FIG. 1, the configuration of a vehicle stop system 1 (hereinafter referred to as "system 1") according to this embodiment will be described. FIG. 1 is a block diagram showing the system 1. The system 1 is equipped in a vehicle, and operable to support stop of the vehicle which is traveling, as an emergency measure. In this Description, a vehicle equipped with the system 1 will be referred to as "vehicle 2".

Further, in this Description, a forward movement direction of the vehicle 2 will be referred to as "front" or "forward", and a backward movement direction of the vehicle 2 will be referred to as "back" or "backward". Further, a left side with respect to the vehicle 2 oriented in the forward movement direction will be referred to as "left" or "leftward".

The system 1 comprises a vehicle exterior camera 31, a vehicle interior camera 32, a navigation device 33, an accelerator pedal sensor 34, a brake pedal sensor 35, a steering sensor 36, and an ECU (Electronic Control Unit) 5.

The vehicle exterior camera 31 is operable to take an image of the outside of the vehicle 2, particularly, the front of the vehicle 2, to acquire image data thereabout. The vehicle exterior camera 31 is composed of, e.g., an image sensor, and installed to a non-illustrated rearview mirror of the vehicle 2. The vehicle exterior camera 31 is also operable to transmit a signal corresponding to the acquired image data, to the ECU 5.

The vehicle interior camera 32 is operable to take an image of the inside of the vehicle 2 to acquire image data thereabout. Specifically, the vehicle interior camera 32 is operable to take an image of a range including the upper body of a driver in a passenger compartment of the vehicle 2. The vehicle interior camera 32 is composed of, e.g., an image sensor, and installed to a non-illustrated instrument panel of the vehicle 2. The vehicle interior camera 32 is also operable to transmit a signal corresponding to the acquired image data, to the ECU 5.

The navigation device 33 is capable of providing various information to a passenger of the vehicle 2. The navigation device 33 stores therein map information or is capable of acquiring map information through communication with a server outside the vehicle 2. The map information contains a road configuration, an upper speed limit assigned to each road in accordance with law or regulation, and a traffic state of each road. The map information also contains information regarding points where ambulances are deployed, such as a fire department and a medical center. The navigation device 33 comprises a sensor for detecting the location of the vehicle 2, such as a GPS (Global Positioning System) senor or a self-contained navigation sensor. The navigation device 33 is operable to provide, to the passenger, map information, and information regarding the position of the vehicle 2 on the map, a time period required for the vehicle 2 to reach a given point, and others, with sound or display. The navigation device 33 is configured to be communicable with the ECU 5, and operable, in response to a request from the ECU 5, to transmit a signal to the ECU 5, thereby providing a variety of information thereto.

The accelerator pedal sensor 34 is a sensor for detecting a depression amount of a non-illustrated accelerator pedal of the vehicle 2. The accelerator pedal sensor 34 is operable to transmit, to the ECU 5, a signal corresponding to the detected depression amount.

The brake pedal sensor 35 is a sensor for detecting a depression amount of a non-illustrated brake pedal of the vehicle 2. The brake pedal sensor 35 is operable to transmit, to the ECU 5, a signal corresponding to the detected depression amount.

The steering sensor 36 is a sensor for detecting a steering direction and a steering angle of a non-illustrated steering wheel of the vehicle 2. For example, the steering sensor 36 is provided with an encoder, and operable to count the number of slits in a plate rotatable together with the steering wheel. The steering sensor 36 is operable to transmit, to the ECU 5, a signal corresponding to the detected steering direction and steering angle.

The ECU 5 is a control device for controlling components through signal transmission and receiving with respect thereto. The ECU 5 is partly or entirely constructed as an analog circuit or as a digital processor. The ECU 5 comprises an abnormality detection part 51, a target time period setting part 53, a candidate detection part 55, a required time period estimation part 57, an allowable value setting part 63, an acceleration estimation part 65, a stop point setting part 67, a vehicle control part 68, and a storage part 69.

In FIG. 1, each function of the ECU 5 is shown as a block. However, it should be understood that a software modules incorporated in the analog circuit or digital processor of the ECU 5 needs not necessarily be divided as shown in FIG. 1. That is, each of the function block shown in FIG. 1 may be further segmentalized, or two or more of the function blocks may be integrated into a single function block which has functions of the two or more function blocks. It is apparent to a person of ordinary skill in the art that the internal configuration of the ECU 5 may be appropriately modified as long as the ECU 5 is configured to be capable of executing the after-mentioned processing routine.

The abnormality detection part 51 is configured to detect a physical abnormality of the driver of the vehicle 2. The abnormality detection part 51 is operable to detect the physical abnormality of the driver, based on signals received by the ECU 5 from the vehicle interior camera 32, the accelerator pedal sensor 34, the brake pedal sensor 35 and the steering sensor 36.

For example, the abnormality detection part 51 is operable to subject the image data acquired by the vehicle interior camera 32 to given processing to identify the upper body, head region, face, eyes, etc., of the driver and acquire information regarding the identified regions. Further, the abnormality detection part 51 is operable to detect information regarding driving manipulations of the driver, based on the signals received from the accelerator pedal sensor 34, the brake pedal sensor 35 and the steering sensor 36. Then, the abnormality detection part 51 is operable to perform a given calculation based on the acquired information to detect the state of consciousness of the driver, an open/closed state of the eyes of the driver, a line-of-sight direction of the driver, the position of the center of gravity of the driver, etc.

Further, the abnormality detection part 51 is operable to determine whether or not the line-of-sight direction of the driver is coincident with a traveling direction of the vehicle 2. Specifically, the abnormality detection part 51 is operable to determine whether or not the line-of-sight direction of the driver falls within a given range including the traveling direction of the vehicle 2. Additionally, the abnormality detection part 51 is operable to determine whether or not the center-of-gravity position of the driver is adequate, based on a distance from a seating surface of a seat on which the driver sits to the center of gravity of the driver.

Then, the abnormality detection part 51 is operable to perform a given calculation based on the above acquired information, to estimate a disorder/disease developing in the body of the driver. Examples of the disorder/disease include cerebrovascular diseases, heart diseases, gastrointestinal diseases, and syncope, which are difficult for the driver himself/herself to predict sudden development thereof.

The target time period setting part 53 is operable to set a target time period, based on the abnormality detected by the abnormality detection part 51. As will be described later, the target time period setting part 53 is operable to set, as the target time period, a time period corresponding to a disorder/disease developing in the body of the driver.

The candidate detection part 55 is configured to detect a stop point candidate. Here, a point at which the system 1 causes the vehicle 2 to stop will be referred to as "stop point", and a point which has a potential to become the stop point will be referred to as "stop point candidate". The candidate detection part 55 is operable to acquire map information based on a signal received from the navigation device 33, and detect a plurality of stop point candidates each of which exists in the traveling direction of the vehicle 2 in the acquired map information, and satisfies a given condition.

The required time period estimation part 57 is configured to estimate a time period required to reach each of the stop point candidates detected by the candidate detection part 55. Specifically, the required time period estimation part 57 is operable to search a course to each of the stop point candidates and determine a vehicle speed pattern of the vehicle 2 when the vehicle 2 travels along the course, and to estimate a time period required for the vehicle 2 to reach each of the stop point candidates, based on a corresponding set of the course and the vehicle speed pattern.

The allowable value setting part 63 is configured to set an allowable lateral acceleration $Gy_a$, based on the abnormality detected by the abnormality detection part 51. The allowable lateral acceleration $Gy_a$ means the maximum valve of a lateral acceleration (i.e., an acceleration in a width direction of the vehicle 2) against which the driver can resist to maintain his/her posture. The allowable value setting part 63 is operable to set a value corresponding to the body condition of the driver as the allowable lateral acceleration $Gy_a$, as described in detail later.

The acceleration estimation part 65 is configured to estimate an acceleration to be generated during traveling of the vehicle 2 to each of the stop point candidates. Specifically, the acceleration estimation part 65 is operable to search a course to each of the stop point candidates and determine a vehicle speed pattern of the vehicle 2 when the vehicle 2 travels along the course, and to estimate the lateral acceleration to be generated during traveling of the vehicle 2 to each of the stop point candidates, based on a corresponding set of the course and the vehicle speed pattern.

The stop point setting part 67 is configured to narrow down the plurality of stop point candidates detected by the candidate detection part 55, based on a given condition, or set one of the stop point candidates, as the stop point. The details of setting of the stop point will be described later.

The vehicle control part 68 is configured to control the behavior of the vehicle 2. Specifically, the vehicle control part 68 is operable to transmit control signals, respectively, to an engine 41 and a brake 42 of the vehicle 2, so as to control the vehicle speed of the vehicle 2. Further, the vehicle control part 68 is operable to subject the image data acquired by the vehicle exterior camera 31, to given processing, to detect a demarcation line of a road on which the vehicle 2 is traveling. Then, the vehicle control part 68 is operable to transmit, to an electric power steering 43, a control signal created based on the detected demarcation line, to control the traveling direction of the vehicle 2.

The storage part 69 is composed of, e.g., a non-volatile memory, and stores therein a variety of information. The information stored in the storage part 69 is read by the abnormality detection part 51 and others, and used for various calculations.

Figure 2:
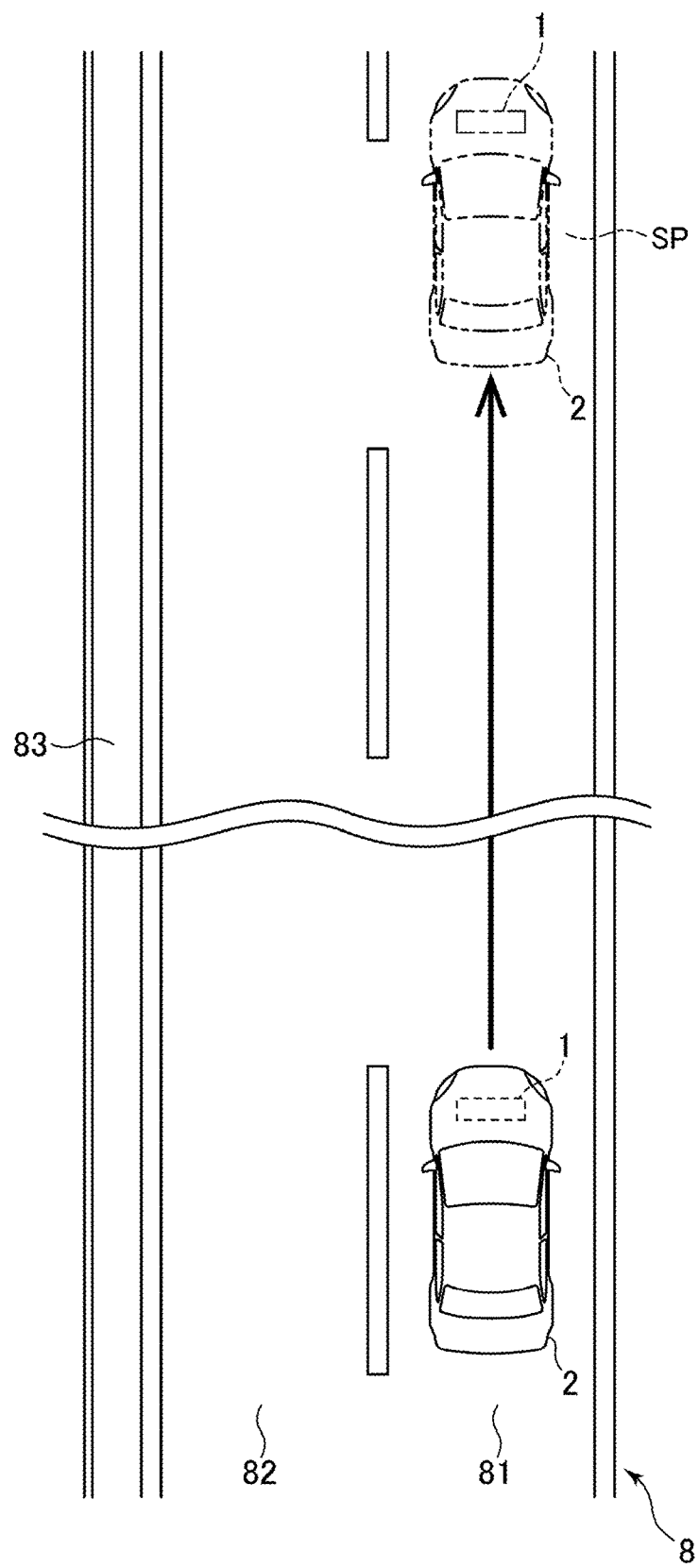
FIG. 2 is an explanatory diagram of a first pattern.
Figure 3:
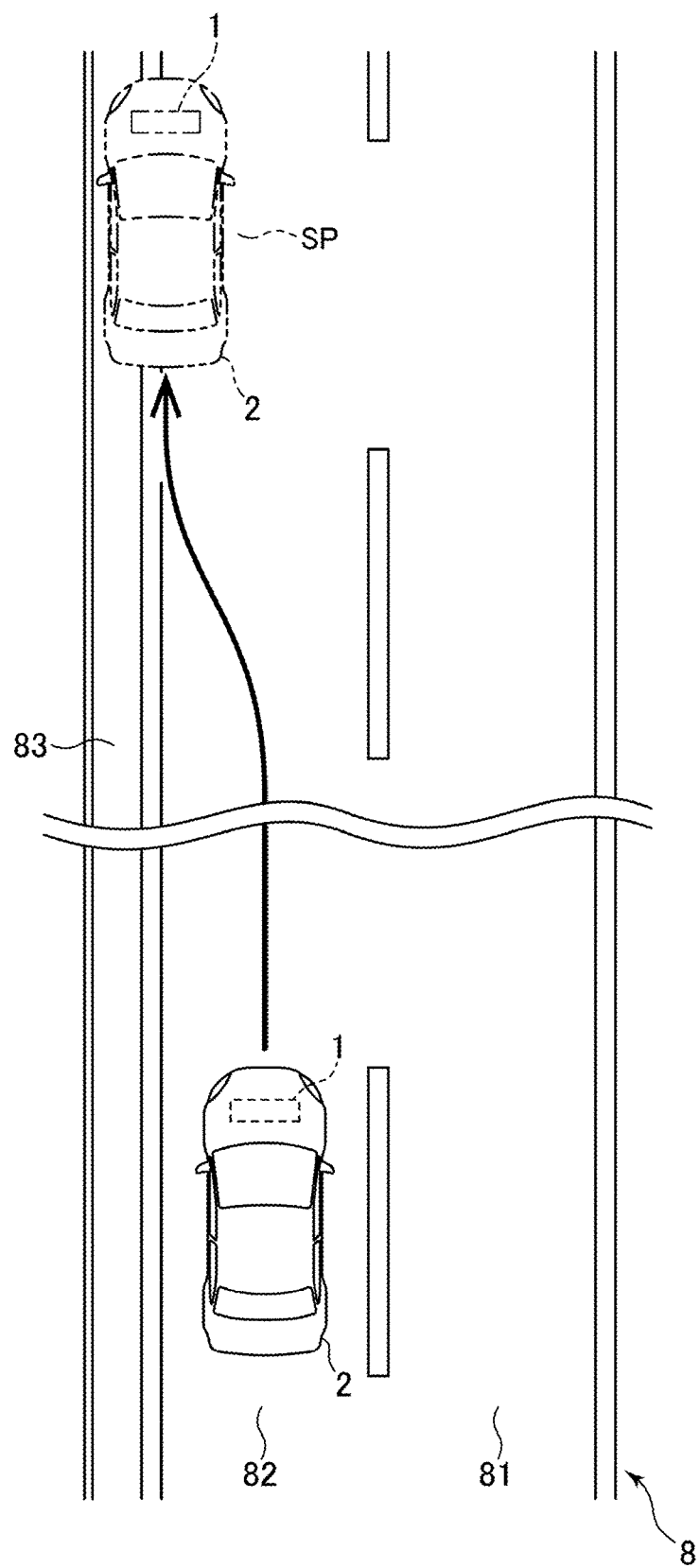
FIG. 3 is an explanatory diagram of a second pattern.
Figure 4:
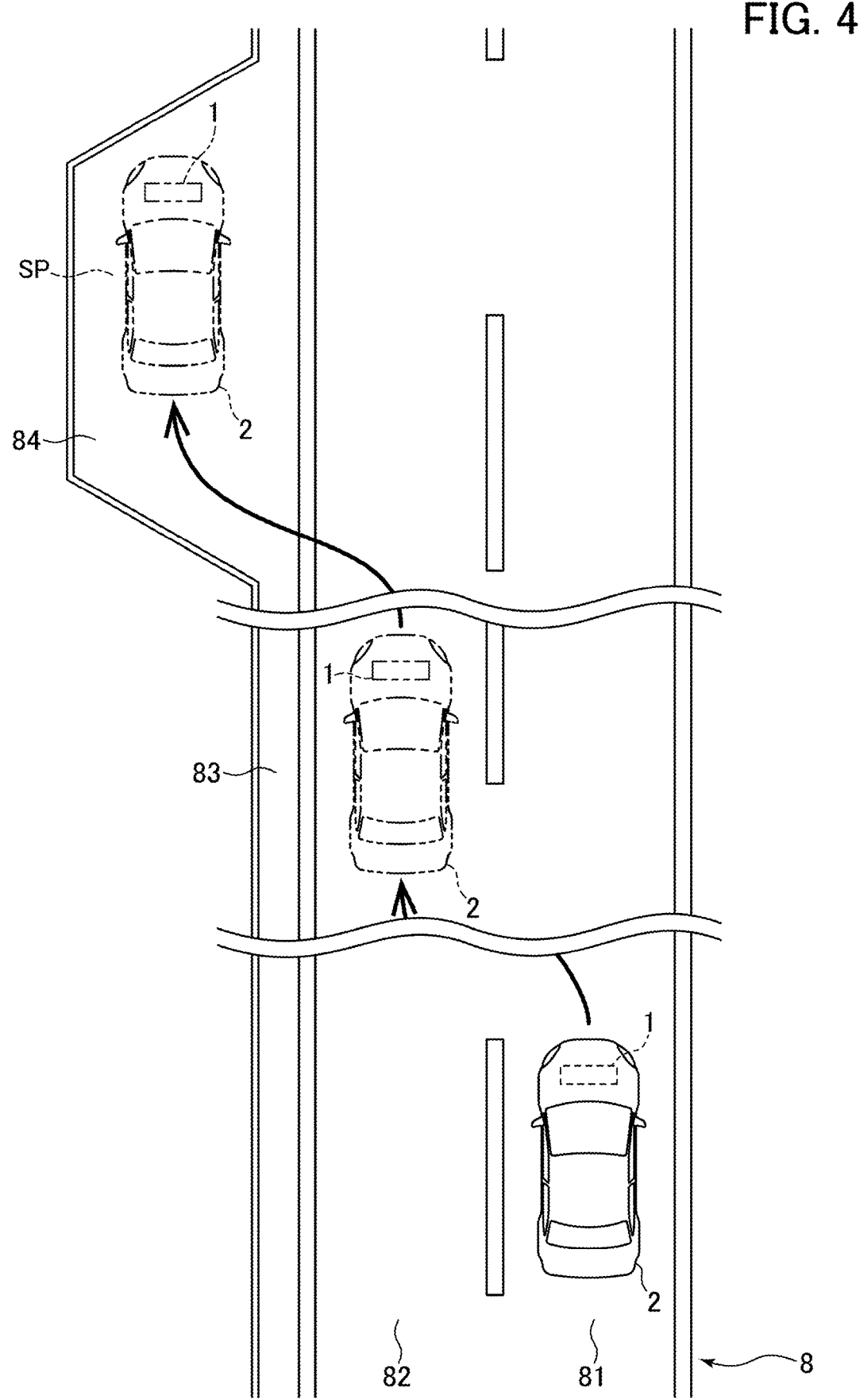
FIG. 4 is an explanatory diagram of a third pattern.

Next, with reference to FIGS. 2 to 4, control of the vehicle 2 by the system 1 will be described. FIGS. 2 to 4 show an environment where it is stipulated that any vehicle shall travel in the left lane, by law or regulation, like the Japanese traffic environment. A road 8 in FIGS. 2 to 4 is a four-lane road, wherein two lanes on one side consists of an overtaking lane 81 and a cruising lane 82. The system 1 is operable, upon satisfaction of a given condition during traveling of the vehicle 2, to control the vehicle 2 to stop at a stop point SP on behalf of the driver, as an emergency measure. The stop point SP is set in one of the following three patterns.

First Pattern

FIG. 2 shows a first pattern in which the stop point setting part 67 (see FIG. 1) of the system 1 operates to set a point within the road 8, as the stop point SP. Specifically, FIG. 2 shows a situation where a given condition is satisfied when the vehicle 2 is traveling in the overtaking lane 81, and a point located on the overtaking lane 81 in the traveling direction of the vehicle 2 is set as the stop point SP. In this situation, the vehicle control part 68 (see FIG. 1) of the system 1 operates to transmit a control signal to the electric power steering 43 (see FIG. 1) so as to controllably cause the vehicle 2 to keep traveling in the overtaking lane 81.

Second Pattern

FIG. 3 shows a second pattern in which the stop point setting part 67 of the system 1 operates to set a road shoulder 83 of the road 8, as the stop point SP. Specifically, FIG. 3 shows a situation where a given condition is satisfied when the vehicle 2 is traveling in the cruising lane 82, and a road shoulder 83 existing in the traveling direction of the vehicle 2 is set as the stop point SP. In this situation, the vehicle control part 68 of the system 1 operates to transmit a control signal to the electric power steering 43 so as to controllably cause the vehicle 2 to keep traveling in the cruising lane 82 and move forwardly and obliquely leftwardly in the vicinity of the stop point SP.

Third Pattern

FIG. 4 shows a third pattern in which the stop point setting part 67 of the system 1 operates to set an emergency parking bay 84 provided on the lateral side of the road 8, as the stop point SP. Specifically, FIG. 4 shows a situation where a given condition is satisfied when the vehicle 2 is traveling in the overtaking lane 81, and an emergency parking bay 84 existing in the traveling direction of the vehicle 2 is set as the stop point SP. In this situation, the vehicle control part 68 of the system 1 operates to transmit a control signal to the electric power steering 43 so as to controllably cause the vehicle 2 to first move from the overtaking lane 81 to the cruising lane 82 and to keep traveling in the cruising lane 82 and move forwardly and obliquely leftwardly in the vicinity of the stop point SP.

In any of the first to third patterns, the vehicle control part 68 operates to, until the vehicle 2 reaches the vicinity of the stop point SP, transmit a control signal to the engine 41 and the brake 42 so as to control the vehicle speed of the vehicle 2 such that it becomes lower than 50 lm/h. Then, the vehicle control part 68 operates to controllably cause the vehicle 2 to stop at the stop point SP. After stop of the vehicle 2, the system 1 operates to blink a blinker and/or sound an alarm to prevent the vehicle 2 from being rear-ended by a following vehicle, and inform the outside of a fact that the driver of the vehicle 2 is in need of rescue.

Next, with reference to FIGS. 5 to 7, a processing routine to be executed by the ECU 5 (see FIG. 1) will be described. FIG. 5 is a flowchart showing the processing routine to be executed by the ECU 5. During traveling of the vehicle 2, this professing routine will be repeatedly executed with a given period. FIG. 6 is a table showing a correspondence relationship between a disorder/disease and a target time period. FIG. 7 is a table showing a correspondence relationship between the body condition of the driver and the allowable lateral acceleration $Gy_a$. It should be noted that processing to be executed by each of the function blocks of the ECU 5 is also described as being executed by the ECU 5, in the lump, for the sake of simplicity of description.

First of all, in step S1 shown in FIG. 5, the ECU 5 operates to detect the body condition of the driver of the vehicle 2. Specifically, the ECU 5 operates to detect, based on the image data acquired by the vehicle interior camera 32 (see FIG. 1), the state of consciousness of the driver, the open/closed state of the eyes of the driver, the line-of-sight direction of the driver, the center-of-gravity position of the driver, etc.

In step S2, the ECU 5 operates to determine whether or not the driver has a physical abnormality. Specifically, the ECU 5 operates to determine, based on a result of the detection in the step S1, whether or not the driver has a physical abnormality which causes the driver to become unable to drive the vehicle 2 safely. For example, the ECU 5 may be configured to quantify the degree of consciousness of the driver, and, when the resulting quantified value is less than a given threshold, determine that the driver has a physical abnormality. When the driver is determined not to have any physical abnormality (S2: NO), the ECU 5 operates to terminate the vehicle stop support processing routine. On the other hand, when the driver is determined to have a physical abnormality (S2: YES), the ECU 5 proceeds to step S3.

In the step S3, the ECU 5 operates to estimate a disorder/disease of the driver. Specifically, the ECU 5 operates to estimate, based on the result of the detection in the step S1, a disorder/disease developing in the body of the driver. The ECU 5 is capable of estimating that one of subarachnoid hemorrhage, myocardial infarction, hypoglycemia and epilepsy develops.

In step S4, the ECU 5 is operable to set a target time period. Specifically, the ECU 5 is operable to set, as the target time period, a time period corresponding to the disorder/disease estimated in the step S3, based on the table shown in FIG. 6.

Data of the table shown in FIG. 6 is preliminarily stored in the storage part 69 (see FIG. 1). In FIG. 6, values of the target time periods T1, T2, T3 are different from each other, wherein each of the values corresponds to the degree of urgency of a corresponding disorder/disease. For example, with respect to a disorder/disease having a relatively high urgency and thus requiring possibly prompt rescue, a relatively short time period is set as the target time period. On the other hand, with respect to a disorder/disease having a relatively low urgency, a relatively long time period is set as the target time period.

In step S5, the ECU 5 operates to detect a stop point candidate. Specifically, the ECU 5 operates to acquire map information, based on a signal received from the navigation device 33, and detect a plurality of points each of which exists within 5 km from the vehicle 2 in the traveling direction of the vehicle 2, and satisfies a given condition, as a plurality of stop point candidates. The given condition may be set based on various factors such as properties of the vehicle 2, properties of the road on which the vehicle 2 is traveling, the body condition of the driver detected in the step S1.

In step S6, the ECU 5 operates to estimate a time period required to reach each of the stop point candidates. Specifically, the ECU 5 operates to first search, based on a given algorithm, a course to each of the stop point candidates detected in the step S5, and determine a vehicle speed pattern of the vehicle 2 when the vehicle 2 travels along the course. Further, the ECU 5 operates to estimate a time period required to reach each of the stop point candidates, based on a corresponding set of the determined course and vehicle speed pattern.

In step S7, the ECU 5 operates to narrow down the stop point candidates. Specifically, in a case where N stop point candidates (where N is an integer of two or more) are detected in the step S5, the ECU 5 operates, in the step S7, to select and leave less-than-N stop point candidates each satisfying the given condition, among the N stop point candidates, and exclude the remaining one or more stop point candidates. More specifically, the ECU 5 operates to select and leave, among the plurality of stop point candidates detected in the step S5, one or more stop point candidates each satisfying a condition that the required time period estimated with respect thereto in the step S6 is equal to or less than the target time period set in the step S4.

In step S8, the ECU 5 operates to set the allowable lateral acceleration $Gy_a$. Specifically, the ECU 5 operates to set, as the allowable lateral acceleration $Gy_a$, a value corresponding to the body condition of the driver detected in the step S1, based on the table shown in FIG. 7.

Data of the table shown in FIG. 7 is preliminarily stored in the storage part 69 (see FIG. 1). In FIG. 7, values of the allowable lateral accelerations $Gy_1$, $Gy_2$, $Gy_3$, $Gy_4$, $Gy_6$, $Gy_8$, $Gy_{10}$ are different from each other, wherein the value of the allowable lateral acceleration $Gy_a$ becomes larger as the value of the subscript a becomes larger. The value of the allowable lateral acceleration $Gy_a$ corresponds to the degree of easiness in maintaining the posture of the driver. For example, in a case where: the driver is conscious; the eyes of the driver is in the open state; the line-of-sight of the driver is coincident with the traveling direction of the vehicle 2; and the center-of-gravity position of the driver is adequate, the driver is in a state in which he/she can easily maintain his/her posture. Thus, the allowable lateral acceleration $Gy_{10}$ having a relatively large value is set. On the other hand, in a case where the driver is unconscious, and the center-of-gravity position of the driver is inadequate, the driver is in a state in which the posture thereof is likely to become largely imbalanced. Thus, the allowable lateral acceleration $Gy_1$ having a relatively small value is set.

In step S9, the ECU 5 operates to estimate a lateral acceleration. Specifically, the ECU 5 operates to estimate a lateral acceleration to be generated during traveling of the vehicle 2 to each of the stop point candidates, based on a corresponding set of the determined course and vehicle speed pattern determined in the step S6.

In step S10, the ECU 5 operates to set a stop point. Specifically, the ECU 5 operates to set, as the stop point, one of the stop point candidates narrowed down in the step S7, which satisfies the condition that the lateral acceleration estimated with respect thereto in the step S9 is equal to or less than the allowable lateral acceleration $Gy_a$ set in the step S8. Here, the lateral acceleration to be compared with the allowable lateral acceleration $Gy_a$ may be the maximum value or average value of the lateral acceleration to be generated during traveling of the vehicle 2 to each of the stop point candidates.

In step S11, the ECU 5 operates to control traveling of the vehicle 2 to the stop point and stop of the vehicle 2 at the stop point. Specifically, the ECU 5 operates to transmit control signals, respectively, to the engine 41, the brake 42 and the electric power steering 43 (see FIG. 1) so as to controllably cause the vehicle 2 to travel to the stop point and stop at the stop point. During this process, the manipulation of the accelerator pedal by the driver is invalidated. On the other hand, the manipulation of the brake pedal by the driver is validated. This is because, even when the driver is becoming unconscious, he/she is likely to attempt to stop the vehicle 2 so as to avoid collision with an obstacle. Here, the vehicle 2 may be configured such that a system for stabilizing the behavior of the vehicle 2, such as an anti-lock braking system or an antiskid brake system, is activated during traveling of the vehicle 2.

Functions/Effects of Embodiment

In the vehicle stop support system according to the above embodiment, one of the stop point candidates which satisfies the condition that the lateral acceleration estimated with respect thereto by the acceleration estimation part 65 is equal to or less than the allowable lateral acceleration $Gy_a$ is set as the stop point. The "allowable lateral acceleration $Gy_a$" means the maximum value of a lateral acceleration against which the driver can resist to maintain his/her posture, and is set based on the abnormality of the driver detected by the abnormality detection part 51. Thus, by setting the allowable lateral acceleration $Gy_a$ to a relatively small value for a severe abnormality, it becomes possible to prioritize suppression of the lateral acceleration, thereby suppressing the situation where the posture of the driver becomes largely imbalanced. On the other hand, by setting the allowable lateral acceleration $Gy_a$ to a relatively large value for a non-severe abnormality, it becomes possible to prioritize traveling of the vehicle 2, thereby stopping the vehicle 2 at the stop point as quick as possible.

In the vehicle stop support system according to the above embodiment, the target time period is set based on the physical abnormality of the driver detected by the abnormality detection part 51. Thus, for example, by setting a relatively short target time period with respect to a physical abnormality having a relatively high urgency, it becomes possible to quickly stop the vehicle 2 to start a rescue operation. On the other hand, by setting a relatively long target time period with respect to a physical abnormality having a relatively low urgency, it becomes possible to set the stop point from among a larger number of stop point candidates.

In the above embodiment, the abnormality detection part 51 is operable to detect the state of consciousness of the driver, wherein the allowable value setting part 63 is operable, when it is detected that the driver is unconscious, to set the allowable lateral acceleration $Gy_a$ to a value less than that to be set when it is detected that the driver is conscious.

According to this feature, when it is detected that the driver is unconscious, the allowable lateral acceleration $Gy_a$ is set to a value less than that to be set when it is detected that the driver is conscious, so that it is possible to suppress the lateral acceleration during traveling of the vehicle 2 to the stop point. This makes it possible to suppress the situation where the posture of the driver becomes largely imbalanced, even when the driver is unconscious.

In the above embodiment, the abnormality detection part 51 is operable to detect an open/closed state of eyes of the driver, wherein the allowable value setting part 63 is operable, when it is detected that the eyes of the driver are in the closed state, to set the allowable lateral acceleration to a value less than that to be set when it is detected that the eyes of the driver are in the open state.

According to this feature, when it is detected that the eyes of the driver are in the closed state, the allowable lateral acceleration $Gy_a$ is set to a value less than that to be set when it is detected that the eyes of the driver are in the open state, so that it is possible to suppress the lateral acceleration during traveling of the vehicle 2 to the stop point. This makes it possible to suppress the situation where the posture of the driver becomes largely imbalanced, even when the eyes of the driver are in the closed state.

In the above embodiment, the abnormality detection part 51 is operable to detect a line-of-sight direction of the driver, and determine whether or not the line-of-sight direction of the driver is coincident with the traveling direction of the vehicle 2, wherein the allowable value setting part 63 is operable, when the line-of-sight direction of the driver is determined not to be coincident with the traveling direction of the vehicle 2, to set the allowable lateral acceleration $Gy_a$ to a value less than that to be set when the line-of-sight direction of the driver is determined to be coincident with the traveling direction of the vehicle 2.

According to this feature, when the line-of-sight direction of the driver is determined not to be coincident with the traveling direction of the vehicle 2, the allowable lateral acceleration $Gy_a$ is set to a value less than that to be set when the line-of-sight direction of the driver is determined to be coincident with the traveling direction of the vehicle 2, so that it is possible to suppress the lateral acceleration during traveling of the vehicle 2 to the stop point. This makes it possible to suppress the situation where the posture of the driver becomes largely imbalanced, even when the line-of-sight direction of the driver is not coincident with the traveling direction of the vehicle 2.

In the above embodiment, the abnormality detection part 51 is operable to detect a center-of-gravity position of the driver, and determine whether or not the center-of-gravity position of the driver is adequate, wherein the allowable value setting part 63 is operable, when the center-of-gravity position of the driver is determined not to be adequate, to set the allowable lateral acceleration $Gy_a$ to a value less than that to be set when the center-of-gravity position of the driver is determined to be adequate.

According to this feature, when the center-of-gravity position of the driver is determined not to be adequate, the allowable lateral acceleration $Gy_a$ is set to a value less than that to be set when the center-of-gravity position of the driver is determined to be adequate, so that it is possible to suppress the lateral acceleration during traveling of the vehicle 2 to the stop point. This makes it possible to suppress the situation where the posture of the driver becomes largely imbalanced, even when the center-of-gravity position of the driver is not adequate.

In the above embodiment, the abnormality detection part 51 is operable to detect a center-of-gravity position of the driver, and determine whether or not the center-of-gravity position of the driver is adequate, wherein the allowable value setting part 63 is operable, when the center-of-gravity position of the driver is determined not to be adequate, to set the allowable lateral acceleration $Gy_a$ to a value less than that to be set when the center-of-gravity position of the driver is determined to be adequate.

According to this feature, when the center-of-gravity position of the driver is determined not to be adequate, the allowable lateral acceleration $Gy_a$ is set to a value less than that to be set when the center-of-gravity position of the driver is determined to be adequate, so that it is possible to suppress the lateral acceleration during traveling of the vehicle to the stop point. This makes it possible to suppress the situation where the posture of the driver becomes largely imbalanced, even when the center-of-gravity position of the driver is not adequate.

In the above embodiment, the vehicle control part 68 is operable, when the abnormality detection part 51 detects the abnormality, to control the vehicle to travel at a vehicle speed which is lower than 50 km/h as a predetermined value.

According to this feature, it is possible to suppress an inertia force acting on the driver during stop of the vehicle 2. This makes it possible to allow the driver in an emergency condition to wait for rescue without a large postural imbalance.

As above, the present invention has been described based on one specific embodiment. However, it should be understood that the present invention is not limited to the specific embodiment. That is, various changes and modifications will be apparent to a person of ordinary skill in the art. Therefore, unless otherwise such changes and modifications depart from the scope of the present invention hereinafter defined, they should be construed as being included therein.

In the above embodiment, the abnormality detection part 51 of the ECU 5 is configured to detect the physical abnormality of the driver based on image data acquired by the vehicle interior camera 32. However, the present invention is not limited to this configuration. For example, in a case where the vehicle stop support system according to the present invention is equipped in a vehicle provided with an infrared sensor for detecting a body temperature or a pulse wave of a driver, a seat sensor for detecting a center-of-gravity position or a pulse wave depending on the posture of the driver, or the like, the abnormality detection part in the present invention may be configured to detect the physical abnormality of the driver based on detection information from such a sensor.

In the above embodiment, the required time period estimation part 57 of the ECU 5 is configured to search a course to each of the stop point candidates and determine a vehicle speed pattern of the vehicle 2 when the vehicle 2 travels along the course. However, the present invention is not limited to this configuration. For example, the required time period estimation part in the present invention may be configured to instruct the navigation device to perform search of the course and determination of the speed pattern, and, based on information provided from the navigation device, estimate the required time period.

In the above embodiment, the acceleration estimation part 65 of the ECU 5 is configured to search a course to each of the stop point candidates and determine a vehicle speed pattern of the vehicle 2 when the vehicle 2 travels along the course. However, the present invention is not limited to this configuration. For example, the acceleration estimation part in the present invention may be configured to instruct the navigation device to perform search of the course and determination of the speed pattern, and, based on information provided from the navigation device, estimate the lateral acceleration.

LIST OF REFERENCE CHARACTERS

1: vehicle stop support system (system)
2: vehicle
51: abnormality detection part
53: target time period setting part
55: candidate detection part
57: required time period estimation part
63: allowable value setting part
65: acceleration estimation part
67: stop point setting part
68: vehicle control part
69: storage part
SP: stop point

The invention claimed is:

1. A vehicle stop support system for supporting stop of a vehicle which is traveling, comprising:
an electronic control unit comprising:
an abnormality detection part for detecting a physical abnormality of a driver;
a target time period setting part for setting a target time period based on the abnormality detected by the abnormality detection part;
an allowable value setting part for setting an allowable lateral acceleration, based on the abnormality detected by the abnormality detection part;
a candidate detection part for detecting a plurality of stop point candidates which exist in a traveling direction of the vehicle;
a required time period estimation part for estimating a time period required to reach each of the stop point candidates;
an acceleration estimation part for estimating a lateral acceleration to be generated during traveling of the vehicle to each of the stop point candidates;
a stop point setting part for setting a stop point; and
a vehicle control part for controlling the vehicle to travel to the stop point and stop at the stop point, wherein
the stop point setting part is configured to set, as the stop point, one of the plurality of stop point candidates which satisfies a condition that the lateral acceleration estimated with respect thereto by the acceleration estimation part is equal to or less than the allowable lateral acceleration and the required time period estimated with respect thereto is equal to or less than the target time period,
the abnormality detection part is configured to detect a state of consciousness of the driver, and
when it is detected that the driver is unconscious, the allowable value setting part is configured to set the allowable lateral acceleration to a value less than that to be set when it is detected that the driver is conscious.

2. The vehicle stop support system according to claim 1, wherein
the abnormality detection part is configured to detect an open/closed state of eyes of the driver, and
when it is detected that the eyes of the driver are in the closed state, the allowable value setting part is configured to set the allowable lateral acceleration to a value less than that to be set when it is detected that the eyes of the driver are in the open state.

3. The vehicle stop support system according to claim 2, wherein
the abnormality detection part is configured to detect a line-of-sight direction of the driver and determine whether or not the line-of-sight direction of the driver is coincident with the traveling direction of the vehicle, and
when the line-of-sight direction of the driver is determined not to be coincident with the traveling direction of the vehicle, the allowable value setting part is configured to set the allowable lateral acceleration to a value less than that to be set when the line-of-sight direction of the driver is determined to be coincident with the traveling direction of the vehicle.

4. The vehicle stop support system according to claim 3, wherein the abnormality detection part is configured to detect a center-of-gravity position of the driver and determine whether or not the center-of-gravity position of the driver is adequate, and when the center-of-gravity position of the driver is determined not to be adequate, the allowable value setting part is configured to set the allowable lateral acceleration to a value less than that to be set when the center-of-gravity position of the driver is determined to be adequate.

5. The vehicle stop support system according to claim 1, wherein the electronic control unit further comprises a storage part preliminarily storing therein a plurality of values of the target time period, each value of the plurality of values of the target time period corresponding to a respective one of a plurality of physical abnormalities, and the target time period setting part is configured to read, from the storage part, one of the stored values of the target time period which corresponds to the abnormality detected by the abnormality detection part.

6. The vehicle stop support system according to claim 1, wherein, when the abnormality detection part detects the abnormality, the vehicle control part is configured to control the vehicle to travel at a vehicle speed which is lower than a predetermined value.

* * * * *